Patented Sept. 23, 1952

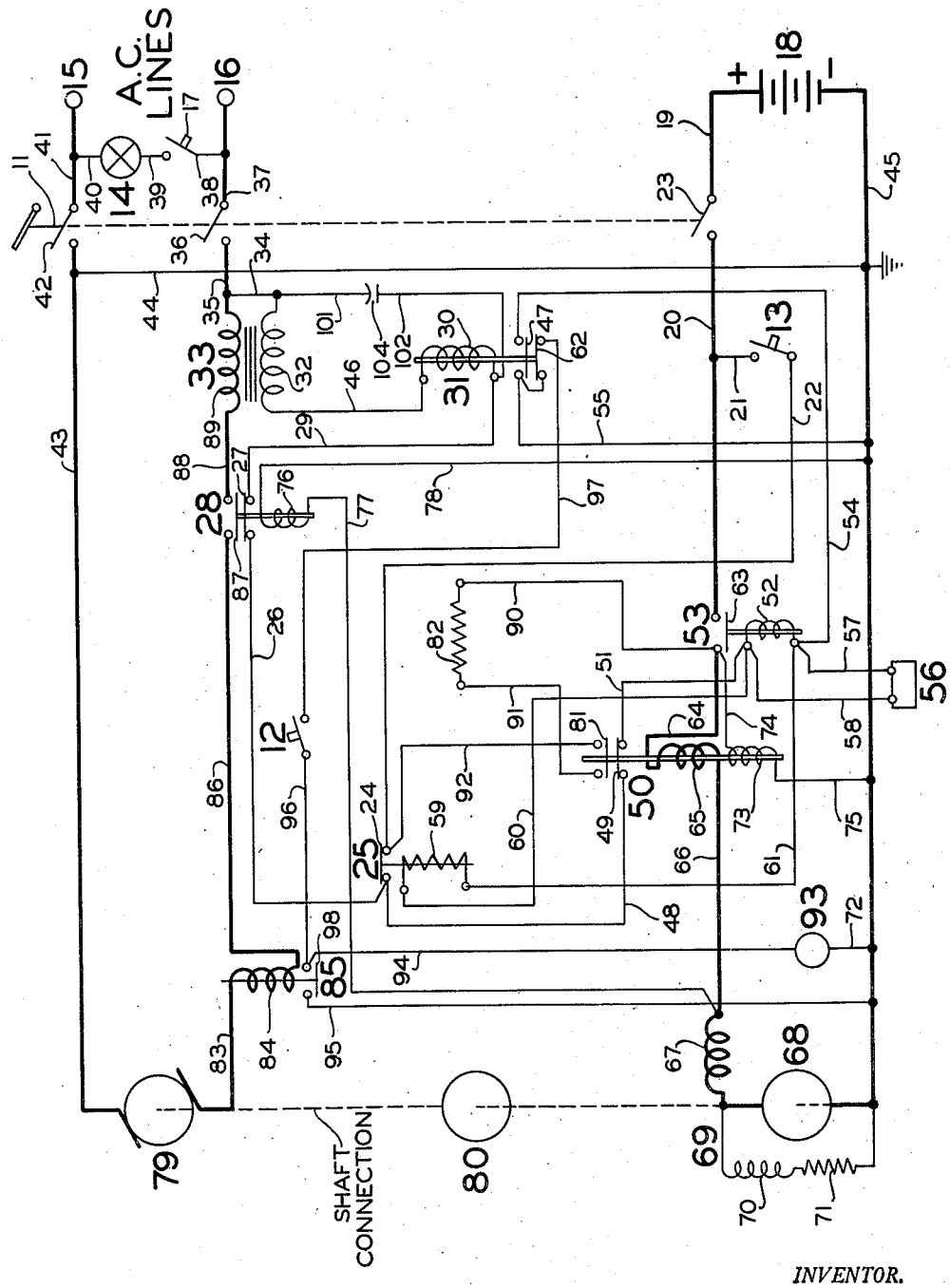

2,611,877

UNITED STATES PATENT OFFICE 2,611,877

AUTOMATIC STARTING ELECTRICAL CONTROL CIRCUIT FOR ENGINE DRIVEN ELECTRIC POWER GENERATORS

Robert E. Walters, Milwaukee, Wis., assignor to Allen-Bradley Company, Milwaukee, Wis., a corporation of Wisconsin Continuation of application Serial No. 31,797, June 8, 1948. This application October 12, 1951, Serial No. 251,099

9 Claims. (Cl. 290—30)

1

My invention relates in general to an automatic-starting electric control circuit for engine driven electric power generators, and in particular to a combination of devices arranged to operate on a low current and to withstand the comparatively high current.

In automatic-starting electric power generators it is necessary to provide a current sensitive device which will operate to closed position on a low current and have its current carrying parts of sufficient size to carry comparatively high currents. Heretofore difficulty has been experienced in the obtainment of an electrically responsive device which was sensitive to small currents, which had capacity to carry large currents, and which was efficient in the matter of work done to power consumed.

It is an object of my invention to provide an electric circuit which is a combination and an arrangement of standard component parts sensitive to small currents and able to withstand comparatively large currents and to do so in an efficient electrical manner. It is also an object of my invention that the electric circuit and its parts shall be comparatively small in physical dimensions, shall be reasonably cheap to manufacture and shall be reliable and have ease of adjustment.

This application is a continuation of my co-pending application entitled "Electric Control Circuit," Serial Number 31,797 filed in the United States Patent Office June 8, 1948.

My invention relates more specifically to an apparatus including a transformer circuit having its primary energized by the load circuit, and the secondary circuit including therein the coil of an electromagnet of a control relay and a suitable capacitance.

In this arrangement the power factor of the secondary circuit at the minimum operating primary current of the transformer is relatively high which results in a higher overall efficiency and a smaller transformer to do the same work.

My invention is exemplified in a control relay circuit which in conjunction with other elements of the power plant circuits is operable to start and stop a self-contained electric lighting plant, that is, a plant with generator and prime mover. On the closing of the load circuit which may be carrying only a single lamp a small direct current flows of the order of 75 milli-amperes through the coil of the electromagnet. This current causes the electromagnet to go to its closed position and a short period thereafter an alternating current of the order of one quarter of an

2 ampere flows from the generator through the primary of the transformer, and the secondary circuit in which the electromagnet is connected has in it an alternating current of the order of 30 milli-amperes, and which current is sufficient to hold the relay in its closed position. With the lighting plant in operation additional load may be thrown into the circuit and a maximum of 15 amperes may be carried through the primary circuit of the transformer. It is evident from the foregoing that the primary of the transformer is carrying currents in the ratio of 60 to 1. My invention, therefore, is the procurement of an arrangement whereby a smaller transformer may be used to keep the relay in its closed position and still cause no burn-out in the operating coils of said transformer and electromagnet and also to secure better efficiency in the operation of the relay.

The secondary load circuit is so arranged that its power factor is relatively high and as a result the size of transformer required, in terms of minimum primary operating current, is reduced. The transformer is designed so that at the higher primary current values its iron circuit becomes saturated, which in turn reduces the ratio of primary to secondary transformation.

It will also be noted that my invention provides a circuit in which the coil of the electromagnet is energized by a direct current connection and that thereafter alternating current is supplied to the coil and that no break is made in the transformer secondary circuit at any time.

In an explanation of my invention incorporated in an electric lighting plant, the single figure of the drawing is a wiring diagram of the power and control connections with component parts.

In describing the operation of this electric lighting plant the usual condition is assumed that is to say that power disconnect switch designated by the numeral 11 is in the on position, magneto switch 12 for magneto 93 is in the closed or automatic position and the control disconnect switch 13 is in on position. When a load of 40 watts or more designated by the numeral 14 is connected to the alternating current lines 15 and 16 by the closing of switch 17, the current from the battery 18 flows through conductor 19, through contact 23 of power disconnect 11, through conductors 20 and 21, through the contacts of control disconnect 13, through conductor 22, through the contacts 24 of thermal timing relay 25, through conductor 26, through contacts 27 of main switch 28, through conductor 29, through the coil 30 of control relay 31, through conductor 46, through the secondary 32 of transformer 33, through conductors 34 and 35, through the contacts 36 of power disconnect 11, through conductors 37 and 38, the contacts of switch 17, conductor 39, load 14, conductors 40 and 41, contact 42 of power disconnect 11, conductors 43 and 44 to conductor 45, back to the other terminal of the battery 18.

On the operation of control relay 31 the normally open contacts 47 close and the current flows from the battery 18 through conductor 19, through the contacts 23 of power disconnect 11, through conductors 20 and 21, switch contacts of control disconnect 13, conductor 22, contacts 24 of thermal timing relay 25, through conductor 48, through the normally closed contacts 49 of reverse current relay 50, through conductor 51, through the coil 52 of starting relay 53, through conductor 54, through the normally open contacts 47 of control relay 31 and thence back to the battery through conductors 55 and 45.

It is to be noted that in the last circuit described coil 52 of starting relay 53 was energized. The automatic choke 56 is also energized through conductors 57 and 58. Also likewise the resistance unit 59 of thermal timing relay 25 is energized through conductors 60 and 61. When the control relay 31 operates the normally closed contacts 62 open the magneto circuit. As the starting relay 53 is operated its normally open contacts 63 close and the current flows through these contacts from the battery and through conductor 64, through the coil 65 of reverse current relay 50, through conductor 66, through the series field 67 and armature 68 of the exciter 69 and back through the conductor 45 to the battery.

It is also to be noted that in the same manner a circuit has been established through the shunt field 70 and through the shunt field resistor 71. The shunt coil 73 of the reverse current relay 50 is energized from the battery circuit through conductors 74 and 75, but at this time the relay does not operate. The coil 76 of the main switch 28 is energized from the battery circuit by conductors 77 and 78, but this relay does not operate at this time. The current flowing in the series coil 65 of reverse current relay 50 neutralizes the effect produced by the shunt coil 73 and the relay cannot therefore operate immediately.

The exciter 69 has its shaft connected to the shaft of the alternator indicated by the numeral 79, and the exciter acts as a motor to bring the alternator and connected engine indicated by the numeral 80 up to cranking speed. When the engine starts supplying power to the system and its speed increases, the current in the series coil 65 of the reverse current relay 50 approaches zero as the exciter develops a voltage equal to the battery voltage, and with the neutralizing effect of the series coil 65 at the low value the relay will operate. When the contacts 49 of relay 50 open, the circuits to the automatic choke 56, the coil 52 of starting relay 53 and the resistance unit 59 of the thermal timing relay 25 are opened. At the same time the normally open contacts 81 of relay 50 close and connect the exciter 69 to the battery, through the charging resistor 82.

This latter circuit is from one terminal of the exciter 69 through conductor 45 to the negative terminal of battery 18 and the other portion of the circuit is from the exciter, through series field 67, conductor 66, coil 65 of relay 50, conductor 64, through conductor 90, through charging resistor 82, through conductor 91, through the contacts 81 of relay 50, through conductor 92, through conductor 22, through contacts of control disconnect 13, through conductors 21 and 20, through contact 23 and conductor 19 to the positive terminal of battery 18. As the engine speed increases and approaches its governor setting the exciter which is now a generator increases its voltage and the main switch 28 operates as its coil 76 is connected to the conductors 66 and 45 leading from the exciter or generator as it now functions. When the normally open contacts 87 of the main switch 28 close the load is operated with alternating current voltage. The load current flowing through the primary 89 of the transformer causes the coil of the control relay to be energized with alternating current voltage produced in the secondary 32 of the transformer. This circuit is from the secondary 32 of the transformer through conductor 101, capacitor 104, conductor 102, coil 30 of control relay 31, through conductor 46 back to the transformer secondary 32. Therefore the control relay remains closed. By the operation of contact 27 of the main switch 28 the alternating current and direct current circuit are separated.

The plant continues in operation as long as the load current is sufficient to hold the control relay closed. When the load current is decreased below the value required to maintain the control relay in the energized position this relay operates to its open position and the contacts 62 close causing the primary circuit of the magneto to be short-circuited. With the magneto short circuited the engine cannot supply power and its speed decreases. The alternating current voltage then decreases in magnitude and frequency and the direct current generated voltage also decreases. When the direct current generated voltage falls to approximately battery voltage the main switch 28 operates to its open position and the load is then disconnected from the alternating current generator circuit. The contacts 27 of relay 28 are closed and the control circuit is set up for the next starting cycle. The engine speed continues to decrease and the generated voltage falls to a still lower value and the reverse current relay 50 operates. When the normally open contacts of the reverse current relay open, the generator and charging resistor are separated from the battery and its normally closed contacts close and complete the starting control circuit. The plant then falls to zero speed.

It is to be noted that during the starting cycle the circuit across the terminals of magneto 93 is through conductors 94 and 96, magneto switch 12, conductor 97, normally closed contacts 62 of control relay 31, through conductors 55, 45 and 72 back to magneto. During normal operation, on the occurrence of an overload the magneto has a circuit completed across its terminals through conductor 94, contacts 98 of overload relay 85, conductors 95, 45 and 72 back to the magneto.

In the above description in which typical values of actual working conditions were assumed the normal operation of the starting and running of a self-contained lighting plant is explained embodying my invention. It is to be noted that, that part of the circuit which embodies my invention is composed of a transformer, a capacitor and an electromagnetically operable relay. These component parts are chosen and so arranged that in this particular case only a very small flow of current is necessary to cause the initiating of the start of this automatic plant, and that a comparatively high load may continue to flow without any change in the control circuit. Also, it is to be noted that the component parts with the arrangement and coordination of parts produce an efficient control in that there is not undue power loss in the transformer, magnet coil of the relay and in the capacitor.

Having described a particular application of my invention, it is intended protection to be afforded hereby extend to the full limit of the inventive advance herein disclosed and as defined by the claims hereto appended.

I claim:

1. In an automatic electric power plant an internal combustion engine; an alternating current generator connected thereto to be driven thereby; an alternating current load circuit connected to said generator adapted to be closed through a load; a storage battery; an electromagnetic switch having a coil and contacts actuated thereby; a direct current energizing circuit extending from said battery through said coil to said load circuit and returning therefrom to said battery, said energizing circuit being adapted to be closed by imposition of a load upon said load circuit; a transformer having a low impedance primary interposed in series relation in said load circuit and having a saturable frame and a secondary winding; a maintaining circuit for said electro-magnetic switch means comprising a capacitance and circuit connections joining said transformer secondary said capacitance and said coil in closed series connection; a starting motor drivingly connected to said engine; and a starting circuit extending from said battery to said starting motor, said starting circuit being closeable in response to actuation of the contacts of said electro-magnetic switch.

2. In an electric power plant an alternating current generator; an internal combustion engine drivingly connected to said generator; a dynamo-electric apparatus connected to said engine to drive and start the same and to be driven as a direct current generator by said engine when started; a load circuit connected in load receiving relation to said alternating current generator; a control transformer having a primary winding interposed in load carrying series connection in said load circuit, said transformer having a saturable frame and a secondary winding; a control relay having a coil and normally open contacts operable thereby; a control relay maintaining circuit comprising a blocking condenser and leads joining said transformer secondary winding, said relay coil and said blocking condenser in closed series circuit to cause said relay to be maintained closed when said load leads are carrying a load; a direct current source including a storage battery and circuit connections extending therefrom to said dynamo-electric apparatus; a control relay energizing circuit comprising connections between said direct current source through said relay coil to said load leads whereby said relay energizing circuit is completed to close said relay whenever said load circuit is closed by a load; and a starting and running circuit including switch means interposed in said direct current source circuit closeable to complete the same in response to closure of said control relay contacts.

3. In a control apparatus for an electric power plant of the type which includes an alternating current generator, an internal combustion engine drivingly connected to said generator, and a dynamo-electric apparatus connected to said engine to drive and start the same and to be driven as a direct current generator by said engine when started which control apparatus comprises load leads having input terminals adapted to be connected in load receiving relation to said alternating current generator and having output terminals at their opposite ends adapted to supply alternating current to a load connected thereto; a control transformer having a primary winding interposed in load carrying series connection in one of said load leads, said transformer having a saturable frame and a secondary winding; a control relay having a coil and normally open contacts operable thereby; a control relay maintaining circuit comprising a blocking condenser and leads joining said transformer secondary winding, said relay coil and said blocking condenser in closed series circuit to cause said relay to be maintained closed when said load leads are carrying a load; a direct current source circuit including battery terminals adapted to be connected to a storage battery and circuit connections extending therefrom to terminals adapted to be connected to said dynamo-electric apparatus; a control relay energizing circuit comprising connections between said direct current source through said relay coil to said load leads whereby said relay energizing circuit is completed to close said relay whenever said load circuit is closed by a load; and a starting and running circuit including switch means interposed in said direct current source circuit closeable to complete the same in response to closure of said control relay contacts.

4. In a control apparatus for an electric power plant of the type which includes an alternating current generator, an internal combustion engine drivingly connected to said generator, and a dynamo-electric apparatus connected to said engine to drive and start the same and to be driven as a direct current generator by said engine when started which control apparatus comprises a load circuit having input terminals adapted to be connected in load receiving relation to said alternating current generator and having output terminals adapted to supply alternating current to a load connected thereto; a normally open output responsive load switch interposed in said load circuit including means operative to close said load switch when said alternating current generator is being driven; a control transformer having a primary winding interposed in load carrying series in connection in said load circuit, said transformer having a saturable frame and a secondary winding; a control relay having a coil and normally open contacts operable thereby; a control relay maintaining circuit comprising a blocking condenser and leads joining said transformer secondary winding, said relay coil and said blocking condenser in closed series circuit to cause said relay to be maintained closed by alternating current when said load circuit is carrying a load; a direct current source circuit including battery terminals adapted to be connected to a storage battery and circuit connections extending therefrom to terminals adapted to be connected to said dynamo-electric apparatus; a control relay energizing circuit comprising connections between said direct current source circuit through said relay coil to haid load circuit, said energizing circuit including an electro-responsive switch means opened by current generated by said dynamo-electric machine whereby said relay energizing circuit is completed to close said relay whenever a load is joined across said output terminals and is opened when said dynamo-electric machine starts generating; and a starting and running circuit including electromagnetically actuated switch means interposed in said direct current source circuit closeable to complete the same in response to closure of said control relay contacts.

5. In a control apparatus for an electric power plant of the type having a load circuit including leads, an alternating current generator in current supplying relation to said load circuit, a prime mover drivingly connected to said generator, and a dynamo-electric apparatus connected to said prime mover to drive and start the same and to be driven as a direct current generator by said prime mover when started, which control apparatus comprises in combination terminals adapted to be connected to a storage battery to provide a direct current source; a control relay having a coil and contacts operable thereby; a relay coil energizing transformer having a primary winding adapted to be interposed in said load circuit leads and a secondary winding; transformer circuit connections joining said secondary winding of said transformer in circuit with said relay coil to maintain said relay closed when load is carried; switching means having coil means responsive to voltage of said dynamo-electric apparatus, said switching means having normally open line contacts adapted to be interposed in said load circuit to open and close the same and normally closed energizing circuit contacts; energizing circuit connections for said relay coil adapted to join said relay coil through said load circuit and said energizing circuit contacts to said direct current source to cause said control relay to be closed whenever a load is imposed by said load circuit; and starting and running circuit connections for said dynamo-electric apparatus including said control relay contacts adapted to join said direct current source to said dynamo-electric apparatus to cause the same to drive and start said prime mover when said control relay is energized, whereupon said switching means becomes operative to close said line contacts and to open said energizing circuit contacts upon occurrence of a generated output by said dynamo-electric apparatus.

6. In a control apparatus for an electric power plant of the type having a load circuit including leads and a manually operable starting switch, an alternating current generator in current supplying relation to said load circuit, a prime mover drivingly connected to said generator, and a dynamo-electric apparatus connected to said prime mover to drive and start the same and to be driven as a direct current generator by said prime mover when started, which control apparatus comprises in combination terminals adapted to be connected to a storage battery to provide a direct current source; a control relay having a coil and contacts operable thereby; a relay coil energizing transformer having a secondary winding and a primary winding adapted to be interposed in load carrying relation with said leads of said load circuit; transformer circuit connections joining said secondary winding of said transformer in circuit with said relay coil to maintain said relay closed when load is carried; switching means having coil means responsive to voltage of said dynamo-electric apparatus, said switching means having normally open line contacts adapted to be interposed in said load circuit to open and close the same and normally closed energizing circuit contacts; energizing circuit connections for said relay coil adapted to join said relay coil through said load circuit and said energizing circuit contacts to said direct current source to cause said control relay to be closed upon closure of said manually operable starting switch; and starting and running circuit connections for said dynamo-electric apparatus including said control relay contacts adapted to join said direct current source to said dynamo-electric apparatus to cause the same to drive and start said prime mover when said control relay is energized, whereupon said switching means becomes operative to close said line contacts and to open said energizing circuit contacts upon occurrence of a generated output by said dynamo-electric apparatus.

7. In a control apparatus for an electric power plant of the type having a load circuit including leads, an alternating current generator in current supplying relation to said load circuit, a prime mover drivingly connected to said generator and a dynamo-electric apparatus connected to said prime mover to drive and start the same and to be driven as a direct current generator by said prime mover when started, which control apparatus comprises in combination terminals adapted to be connected to a storage battery to provide a direct current source; a control relay having a coil and contacts operable thereby; a relay coil energizing transformer having a primary winding adapted to be interposed in load current carrying relation with said leads of said load circuit and a secondary winding; a blocking condenser; transformer circuit connections joining said secondary winding of said transformer in series circuit with said relay coil and said blocking condenser to maintain said relay closed when load is carried; switching means having coil means responsive to voltage of said dynamo-electric apparatus; said switching means having normally open line contacts adapted to be interposed in said load circuit to open and close the same and normally closed energizing circuit contacts; energizing circuit connections for said relay coil adapted to join said relay coil through said load circuit, said secondary winding, and said energizing circuit contacts to said direct current source to cause said control relay to be closed whenever a load is imposed by said load circuit; and starting and running circuit connections for said dynamo-electric apparatus including said control relay contacts adapted to join said direct current source to said dynamo-electric apparatus to cause the same to drive and start said prime mover when said control relay is energized, whereupon said switching means becomes operative to close said line contacts and to open said energizing circuit contacts upon occurrence of a generated output by said dynamo-electric apparatus.

8. In a control apparatus for an electric power plant of the type having a load circuit including leads, an alternating current generator in current supplying relation to said load circuit, a prime mover drivingly connected to said generator and a dynamo-electric apparatus connected to said prime mover to drive and start the same and to be driven as a direct current generator by said prime mover when started, which control apparatus comprises in combination terminals adapted to be connected to a storage battery to provide a direct current source; a control relay having a coil and contacts operable thereby; a relay coil energizing transformer having a primary winding adapted to be interposed in load carrying relation with said leads of said load circuit and a secondary winding; transformer circuit connections joining said secondary winding of said transformer in circuit with said relay coil to maintain said relay closed when load is carried; a load line contactor having a coil responsive to voltage of said dynamo-electric apparatus, said load line contactor having normally open line contacts adapted to be interposed in said load circuit to open and close the same and normally closed energizing circuit contacts; energizing circuit connections for said relay coil adapted to join said relay coil through said load circuit and said energizing circuit contacts to said direct current source to cause said control relay to be closed whenever a load is imposed by said load circuit; a dynamo-electric apparatus contactor having a coil and normally open contacts operable thereby; dynamo-electric apparatus contactor coil circuit connections adapted to join said dynamo-electric apparatus contactor coil through said control relay contacts when closed to said direct current source whereby said dynamo-electric apparatus contactor contacts are closed upon energization of said control relay; dynamo-electric apparatus circuit connections adapted to join said dynamo-electric apparatus through said dynamo-electric apparatus contactor contacts to said direct current source to cause the same to drive and start said prime mover when said control relay is energized; and a load line contactor circuit connections adapted to join said load line contacts and to open said energizing circuit contacts upon occurrence of a generated output by said dynamo-electric apparatus.

9. In a control apparatus for an electric power plant of the type having a load circuit including leads, an alternating current generator in current supplying relation to said load circuit, a prime mover having a magneto drivingly connected to said generator and a dynamo-electric apparatus connected to said prime mover to drive and start the same and to be driven as a direct current generator by said prime mover when started, which control apparatus comprises in combination terminals adapted to be connected to a storage battery to provide a direct current source; a control relay having a coil and a pair of contact sets operable thereby said first set being normally open and the second set being normally closed; a relay coil energizing transformer having a primary winding adapted to be interposed in said load circuit leads and a secondary winding; transformer circuit connections joining said secondary winding of said transformer in series circuit with said relay coil to maintain said first set of relay contacts closed and said second set of relay contacts open when load is carried; switching means having coil means responsive to voltage of said dynamo-electric apparatus, said switching means having normally open line contacts adapted to be interposed in said load circuit to open and close the same and normally closed energizing circuit contacts; energizing circuit connections for said relay coil adapted to join said relay coil through said load circuit and said energizing circuit contacts to said direct current source to cause said control relay to be closed whenever a load is imposed by said load circuit; a magneto contactor having normally open contacts and a coil adapted to be interposed in load carrying relation with said load circuit leads to cause the contacts to close upon an overload of predetermined value passing therethrough; magneto circuit connections including said magneto contactor contacts and the second set of said control relay contacts adapted to be joined to said magneto whereby said magneto is short circuited upon itself through said contacts of said magneto contactor when closed and is short circuited upon itself through the second set of said relay contacts when closed; and starting and running circuit connections for said dynamo-electric apparatus including the first set of said control relay contacts adapted to join said direct current source to said dynamo-electric apparatus to cause the same to drive and start said prime mover when said control relay is energized, whereupon said switching means becomes operative to close said line contacts and to open said energizing circuit contacts upon occurrence of a generated output by said dynamo-electric apparatus.

ROBERT E. WALTERS.

REFERENCES CITED

The following references are of record in the file of this patent:

UNITED STATES PATENTS

| Number | Name | Date |
|---|---|---|
| 1,389,716 | Van Vleet | Sept. 6, 1921 |
| 1,498,346 | Bucher | June 17, 1924 |
| 1,662,366 | Cosgray | Mar. 13, 1928 |
| 1,704,996 | Witzel | Mar. 12, 1929 |
| 1,795,053 | Strong | Mar. 3, 1931 |
| 1,842,509 | Dickey | Jan. 26, 1932 |
| 1,851,989 | Seeger | Apr. 5, 1932 |
| 1,866,494 | Strong | July 5, 1932 |
| 1,895,355 | Traver | Jan. 24, 1933 |
| 1,895,357 | Warrington | Jan. 24, 1933 |
| 2,006,524 | Strong | July 2, 1935 |
| 2,179,680 | Baer et al. | Nov. 14, 1939 |
| 2,360,954 | Logan | Oct. 24, 1944 |
| 2,362,194 | Dodd | Nov. 7, 1944 |
| 2,495,791 | Van Daele | Jan. 31, 1950 |

FOREIGN PATENTS

| Number | Country | Date |
|---|---|---|
| 375,269 | Great Britain | Dec. 17, 1930 |